United States Patent
Saito et al.

(10) Patent No.: US 7,326,048 B2
(45) Date of Patent: Feb. 5, 2008

(54) VALVE NOZZLE

(75) Inventors: Toshio Saito, Tokyo (JP); Mei Mori, Tokyo (JP)

(73) Assignee: FISA Corporation, Tokyo (JP)

( * ) Notice: Subject to any disclaimer, the term of this patent is extended or adjusted under 35 U.S.C. 154(b) by 166 days.

(21) Appl. No.: 11/020,472

(22) Filed: Dec. 27, 2004

(65) Prior Publication Data

US 2005/0175732 A1 Aug. 11, 2005

(30) Foreign Application Priority Data

Feb. 5, 2004 (JP) ............................. P2004-29370
Aug. 26, 2004 (JP) ............................. P2004-246263

(51) Int. Cl.
*B29C 45/24* (2006.01)

(52) U.S. Cl. ..................................................... 425/563

(58) Field of Classification Search ................ 425/562, 425/563, 564, 565
See application file for complete search history.

(56) References Cited

U.S. PATENT DOCUMENTS 3,954,209 A 5/1976 Ramond
5,380,188 A * 1/1995 Ullisperger ................. 425/563

FOREIGN PATENT DOCUMENTS

DE 43 10 566 A1 9/1994
DE 297 00 026 U1 2/1997
JP 61239916 10/1986

* cited by examiner

*Primary Examiner*—Tim Heitbrink
(74) *Attorney, Agent, or Firm*—Roylance, Abrams, Berdo & Goodman, L.L.P.

(57) ABSTRACT

The valve nozzle according to the invention is constructed so that, in the internal space of a valve nozzle main body, a gate opening and closing mechanism is disposed in which a piston having a head part and a shaft part, a torpedo that is disposed in the internal space of the nozzle head and slidably supports the piston and guides the piston, and is provided with, on its outer circumferential surface, concaved grooves that are twisted with respect to a resin injection direction and serve as a plurality of wound resin flow channels, a coil spring that presses the piston in the direction toward a gate, and a cover that closes the rear end of the torpedo and serves as a spring receiving part of the coil spring are integrally assembled, and when the resin pressure is at a predetermined value or less, the entire circumference of the circular section of the head part of the piston comes into contact with the inner wall of the gate of the nozzle head to close the resin flow channels, and when the resin pressure becomes a predetermined value or more, the head part withdraws from the gate to release the gate.

8 Claims, 6 Drawing Sheets

VALVE NOZZLE

The present invention relates to a valve nozzle to be used for a synthetic resin molding machine, more specifically, a valve nozzle and a shut-off nozzle to be used for hot runner molding.

Japan Unexamined Patent Publication No. S57-163542 (hereinafter, simply referred to as Document 1) discloses a valve nozzle which opens and closes a flow channel by making the front end of a shut-off pin contact with a gate on the front end of a nozzle head, and is constructed so that the shut-off pin is pressed in the direction toward the gate by a coil spring installed inside a sealed chamber, and when a resin pressure becomes equal to or higher than a certain value and the shut-off pin overcomes the pressing force of the coil spring, the shut-off pin moves inward in the direction of the sealed chamber to open the gate.

In the method shown in Document 1, when the resin flow channel is closed, the residual stress around the gate is great, and a molded item easily cracks at this portion. Furthermore, when a resin is injected through the gate by opening the resin flow channel, the resin advances straight along the space in the gate, and changes its flow sideward by contact with the mold. Therefore, in this construction, the flow of the resin around the gate deteriorates.

Prior to this patent application, the present inventor proposed the construction described in Japan Unexamined Patent Publication No. H11-034109 (hereinafter, simply referred to as Document 2) as a valve nozzle in which the resin flow around the gate was improved and residual stress around the gate was reduced.

The technique described in the above-mentioned Document 2 could solve the problem of Document 1, however, it was found that the technique required strict temperature control so as to prevent the resin flow around the gate from deteriorating since an optimum temperature range of the resin was narrow, and had a point to be improved in that a flow mark easily remained on a molded item.

The inventor further studied and examined, and found a cause in that heat balance of the resin deteriorated around the gate since the resin flow channel was provided only at the notched portion of the head part and the resin flow was a local flow, and proposed the construction described in the specification and drawings of Japanese Patent Application No. 2002-001765 as a valve nozzle which had a wide temperature control range and could provide a molded item which does not have a conspicuous flow mark.

The inventor further studied and found a problem to be solved in maintenance. In the construction described in the specification and drawings of the above-mentioned Japanese Patent Application No. 2002-001765, for maintenance, the collar is removed by removing the nozzle head, the coil spring is then removed, and the spool having a feather-shaped projection is removed last, so that multi-stage disassembly is required.

Therefore, an object of the invention is to provide a valve nozzle which maintains the performance of the previously proposed technique and is improved in maintenance.

The invention that solves the problem is constructed as follows.

It is expected that the above-mentioned construction of the invention provides the following effects.

According to (1) through (5) of the invention, in the internal space of a valve nozzle main body comprising a nozzle holder and a nozzle head attached to the front end of the nozzle holder, a gate opening and closing mechanism in which a piston, a torpedo, and a cover are integrally installed is provided, so that the whole of the gate opening and closing mechanism can be removed at one time for maintenance by removing the nozzle head. Therefore, the maintenance is improved and the above-mentioned problem is solved.

(1) A valve nozzle, wherein in an internal space of a valve nozzle main body comprising a nozzle holder and a nozzle head attached to the front end of the nozzle holder, a gate opening and closing mechanism is disposed which comprises, in an integrally assembled manner:

a piston having a head part and a shaft part formed continuously from the head part;

a torpedo which is disposed in the internal space of the nozzle head and slidably supports the piston and guides the piston, and is provided with, on its outer circumferential surface, concaved grooves twisted with respect to the resin injection direction and serve as a plurality of wound resin flow channels;

a coil spring which is disposed inside the torpedo and inserted with the shaft part of the piston, and presses the piston in the direction toward the gate; and a cover which is attached to the rear end of the torpedo to close the rear end and serves as a spring receiving part of the coil spring, and when the resin pressure is at a predetermined value or less, the piston is pressed in the direction toward the gate by the coil spring and the entire circumference of the circular section of the head part of the piston comes into contact with the gate inner wall of the nozzle head to close the resin flow channels, and when the resin pressure becomes a predetermined value or more, the head part of the piston overcomes the pressing forces of the coil spring and withdraws from the gate of the nozzle head to release the gate.

(2) The valve nozzle according to the above (1), wherein the concaved grooves that serve as a plurality of resin flow channels provided on the outer circumferential surface of the torpedo are wound in one direction.

(3) The valve nozzle according to the above (2), wherein the concaved grooves that are provided on the outer circumferential surface of the torpedo and serve as resin flow channels are concaved grooves that are formed axisymmetrically and serve as two resin flow channels continuously wound.

(4) The valve nozzle according to the above (1), wherein the concaved grooves that are provided on the outer circumferential surface of the torpedo and serve as resin flow channels are concaved grooves that are provided in parallel and serve as a plurality of resin flow channels intermittently wound.

(5) A valve nozzle, wherein in an internal space of a valve nozzle main body comprising a nozzle holder and a nozzle head attached to the front end of the nozzle holder, a gate opening and closing mechanism is disposed while leaving spaces that serve as resin flow channels between the outer circumferential surface of the gate opening and closing mechanism and the inner circumferential surface of the valve nozzle main body, which comprises, in an integrally assembled manner:

a piston having a head part and a shaft part formed continuously from the head part;

a torpedo which is disposed in the internal space of the nozzle head and slidably supports the piston and guides the piston, and is provided with, on its outer circumferential surface, two or more convex streaks that come into contact with the inner circumferential surface of the valve nozzle main body;

a coil spring which is disposed inside the torpedo and inserted with the shaft part of the piston, and presses the piston in the direction toward the gate; and a cover which is attached to the rear end of the torpedo to close the rear end and serves as a spring receiving part of the coil spring, and when the resin pressure is at a predetermined value or less, the piston is pressed in the direction toward the gate by the coil spring and the entire circumference of the circular section of the head part of the piston comes into contact with the gate inner wall of the nozzle head to close the resin flow channels, and when the resin pressure becomes a predetermined value or more, the head part of the piston overcomes the pressing force of the coil spring and withdraws from the gate of the nozzle head to release the gate.

(6) The valve nozzle according to the above (5), wherein the convex streaks of the torpedo are formed by being twisted with respect to the resin injection direction.

(7) The valve nozzle according to the above (5), wherein a blade that causes twisting with respect to the resin injection direction is formed on at least the gate side of the convex streaks of the torpedo.

According to the above (1) and (2) through (4) of the invention, a plurality of concaved grooves which are twisted with respect to a resin injection direction and serve as resin flow channels wound in one direction are formed on the outer circumferential surface of the torpedo, whereby the injected resin uniformly radially flows in all directions without flowing straight, so that the flow around the gate is smooth, and immediately before the gate, the resin is injected in all directions 360°, whereby this provides an effect of smooth resin flow.

Particularly, according to (3) of the invention, since two wound concaved grooves serving as resin flow channels are provided axisymmetrically, the resin flow balance becomes excellent and can cope with high-pressure injection molding.

According to (6) or (7) of the invention, the spaces between the torpedo outer circumferential surface and the valve nozzle main body are used as resin flow channels, convex streaks and/or a blade on the torpedo outer circumferential surface of the torpedo which are twisted with respect to the resin injection direction, whereby the injected resin uniformly radially flows in all directions without flowing straight, so that the flow around the gate is smooth and the resin is injected in all directions 360° immediately before the gate, and this provides an effect of smooth resin flow.

DETAILED DESCRIPTION OF PREFERRED EMBODIMENTS

Next, the present invention is described in greater detail with reference to the accompanying drawings.

First Embodiment

First, a first embodiment is described with reference to FIG. 1 through FIG. 4.

Figure 1:
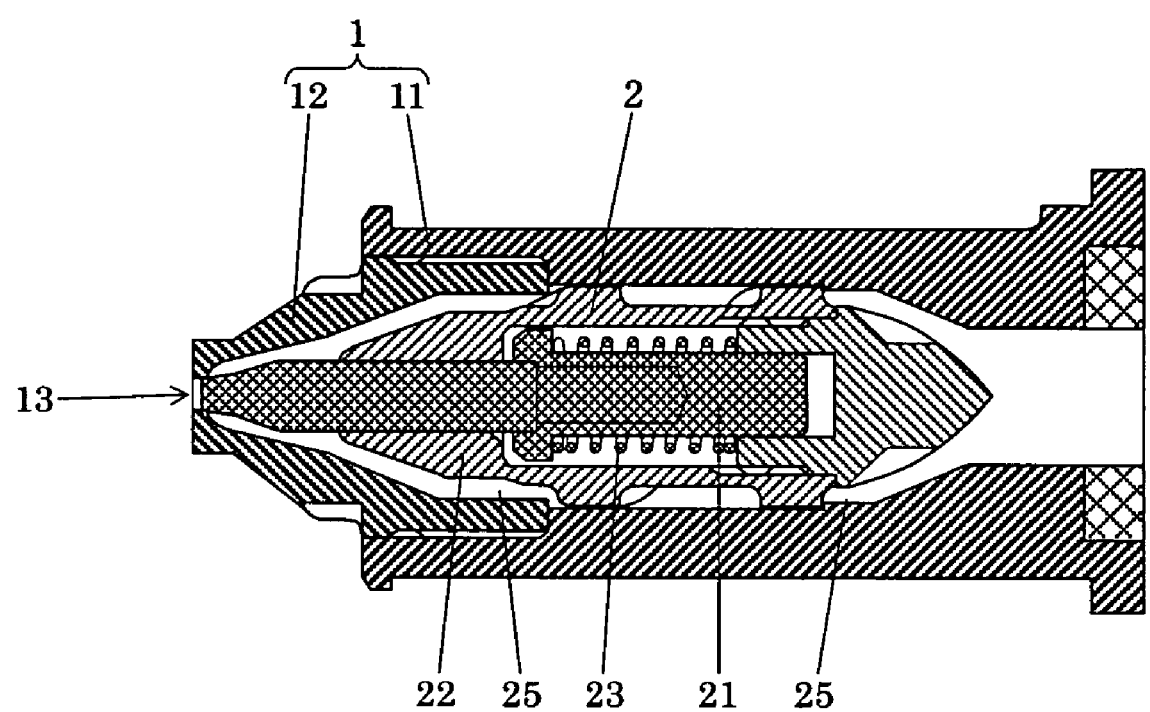
FIG. 1 is a sectional view showing a first embodiment of a valve nozzle according to the invention.

In FIG. 1, the valve nozzle of the first embodiment of the invention mainly comprises a valve nozzle main body 1 and a gate opening and closing mechanism 2 provided in the internal space of the valve nozzle main body 1.

Figure 2:
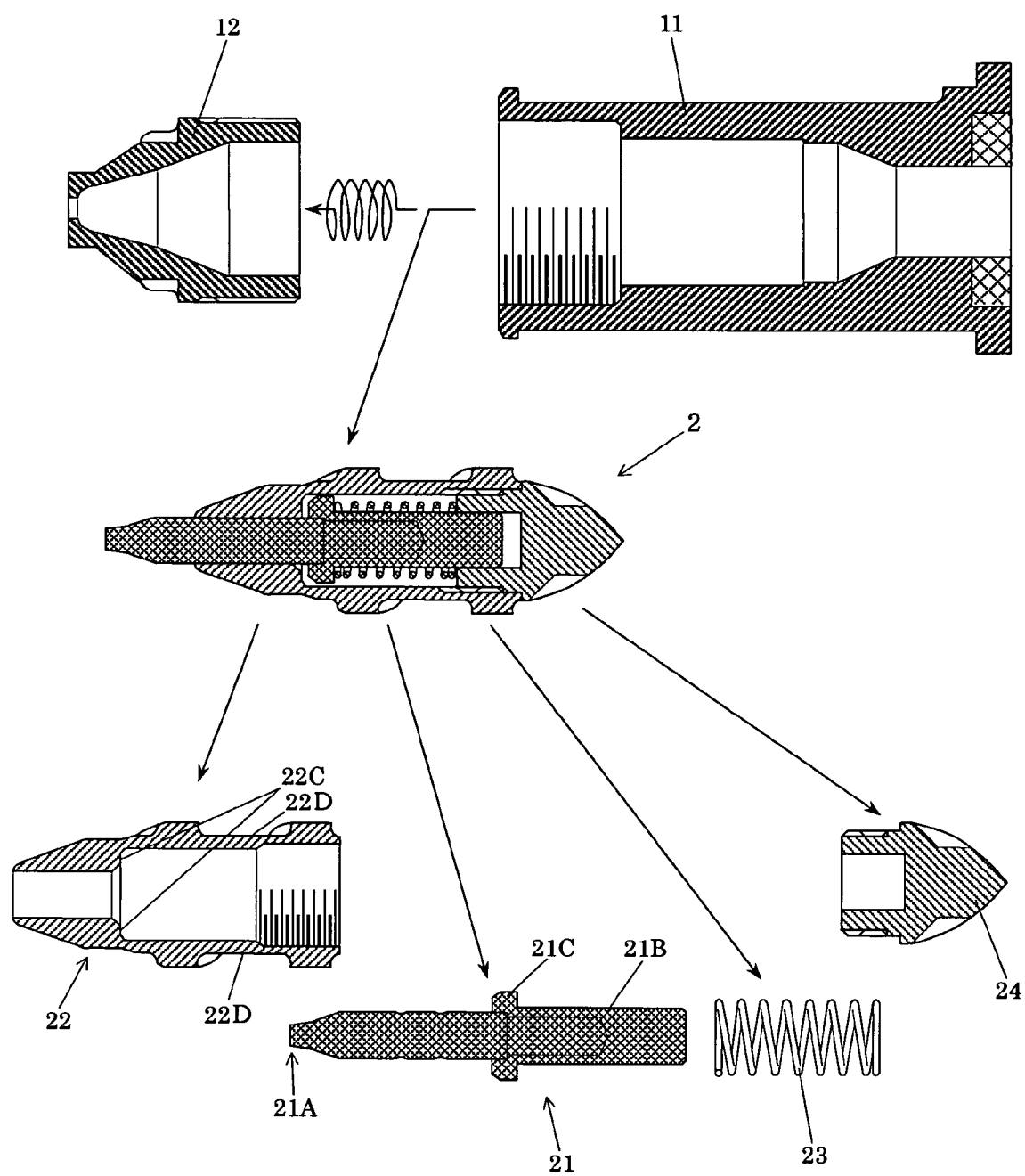
FIG. 2 is an exploded explanatory view of FIG. 1.

The valve nozzle main body 1 comprises, as shown in FIG. 2, a nozzle holder 11 and a nozzle head 12 to be screwed with the nozzle holder 11, and on the front end of the nozzle head, a gate 13 is formed.

The gate opening and closing mechanism 2 comprises, as shown in FIG. 2, a piston 21 having a head part 21A and a shaft part 21B formed continuously from the head part 21A, a torpedo 22 which slidably supports the piston 21 and serves as a guide for the piston 21, and is provided with, on its outer surface, concaved grooves 22D that are twisted with respect to the resin injection direction and serve as a plurality of resin flow channels wound in one direction, a coil spring 23 which is disposed inside the torpedo 22 and is inserted with the shaft part 21B of the piston 21 and presses the piston in the direction toward the gate 13 (to the left side of the drawing), and a cover 24 which is attached to the rear end of the torpedo 22 to close the rear end and serves as a spring receiving part of the coil spring 23, and these members are installed integrally and disposed in the internal space of the valve nozzle main body 1.

Figure 3:
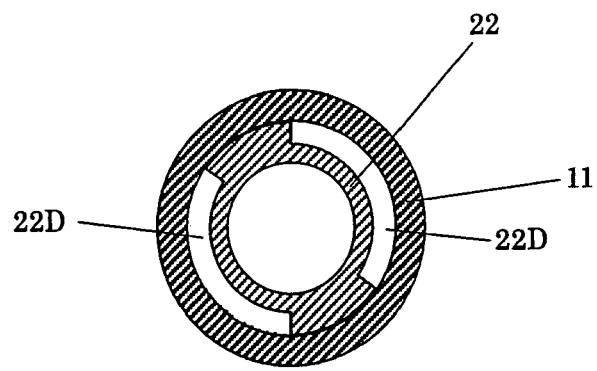
FIG. 3 is a main part sectional view showing resin flow channels (viewed from the resin injection direction).

The gate opening and closing mechanism 2 is disposed in the internal space of the valve nozzle main body 1 so that spaces are left between the outer circumferential surface of the gate opening and closing mechanism 2 and the inner circumferential surface of the nozzle holder 11 of the valve nozzle main body 1. Namely, the concaved grooves 22D that are formed on the outer circumferential surface of the torpedo 22 as one component of the gate opening and closing mechanism 2 and serve as a plurality of resin flow channels form spaces between the same and the inner circumferential surface of the nozzle holder 11 of the valve nozzle main body 1 as shown in FIG. 3, and these spaces serve as resin flow channels when a resin is injected. The outer circumferential surface of the torpedo 22 provided with no concaved grooves 22D as resin flow channels support the gate opening and closing mechanism 2 including the torpedo 22 in the internal space of the valve nozzle main body 1 by contact with the inner circumferential surface of the nozzle holder 11 of the valve nozzle main body 1.

The concaved grooves 22D serving as resin flow channels may be formed by forming concaved grooves on the outer circumferential surface of the torpedo 22, may be provided by making the portions to become resin flow channels concaved by forming the outer circumferential surface of the torpedo 22 except for the portions to become concaved grooves 22D as resin flow channels into convex streaks, or may be provided by a mixture of these.

Figure 4:
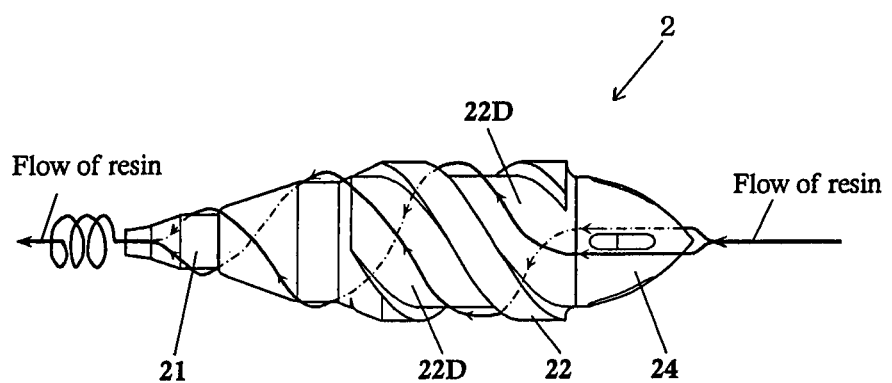
FIG. 4 is a front view of a gate opening and closing mechanism.

A plurality of concaved grooves 22D to serve as resin flow channels are formed, and preferably, as shown in FIG. 3 and FIG. 4, two grooves wound in one direction are provided axisymmetrically. It is also possible that three or more grooves are provided in a well-balanced manner.

The concaved grooves 22D to serve as resin flow channels are not limited to those wound continuously shown in FIG. 4, and may be a plurality of grooves intermittently wound and arranged in parallel. In this case, at the intermittent portions, resin flowing in the concaved grooves arranged in parallel flow into each other, and after mixing at the joint portion, they are branched again to flow into the respective concavedd grooves arranged in parallel.

Furthermore, in the case of intermittent flow channels, they are not limited to a plurality of grooves formed in parallel to each other, and it is also possible that a plurality of concaved grooves are wound so as to intersect each other. In this case, the plurality of grooves are not wound in the same direction but are wound in different directions so as to intersect each other, and the resin flowing in the grooves is mixed at the intersection of the concaved grooves, and the resin is mixed at the intersection and then branched again to flow into the respective concaved grooves.

As described above, the resin injected through the concaved grooves 22D serving as resin flow channels does not flow straight but flows while being twisted, so that the resin uniformly radially flows in all directions, and the flow around the gate 13 becomes smooth and the resin is injected in all directions 360° immediately before the gate 13, whereby the resin flow becomes smooth.

When the nozzle is closed (as shown in FIG. 1), the piston 21 stands still while a flange part 21C formed in the middle of the shaft part 21B is in contact with a stepped portion C formed inside the torpedo 22. The head part 21A of the piston 21 has a circular section, and when the nozzle is closed, the outer circumference of the circular section portion in the vicinity of the front end of the head part 21A is in contact with the inner wall of the circular hole of the gate 13 and closes the resin flow channel 25.

When the resin pressure becomes equal to or higher than a predetermined value, the head part 21A of the piston 21 overcomes the pressing force of the coil spring 23 and withdraws from the gate 13 of the nozzle head 12 to release the gate 13 to open the resin flow channels 25. It is preferable that the withdrawal amount of the piston 21 is properly set according to the pressing force of the coil spring 23 or by positional adjustment of the cover 24 to be attached to the rear end of the torpedo 22. When the resin pressure becomes a predetermined value or less, the piston 21 returns to the state shown in FIG. 1 and the resin flow channels 25 are closed.

The piston 21 is slidably supported by the torpedo 22 as described above, when it moves, the torpedo 22 serves as a guide, so that the piston can accurately reciprocate straight without positional deviation of the head part 21 from the gate 13.

According to the first embodiment of the invention constructed as described above, in the internal space of the valve nozzle main body 1 comprising the nozzle holder 11 and the nozzle head 12 attached to the front end of the nozzle holder 11, the gate opening and closing mechanism 2 in which the piston 21, the torpedo 22, the coil spring 23, and the cover 24 are integrally installed is provided, so that for maintenance, by removing the nozzle head 12, the whole of the gate opening and closing mechanism 2 can be removed at one time. Therefore, in comparison to the previously proposed technique which requires multi-stage disassembly in that, after the nozzle head is removed, the cover is removed, the coil spring is removed, and finally, the spool having a feather-shaped projection is removed, maintenance is remarkably improved.

Particularly, the gate opening and closing mechanism 2 is installed in the internal space of the valve nozzle main body 1 so as to leave spaces between the outer circumferential surface of the gate opening and closing mechanism 2 and the inner circumferential surface of the valve nozzle main body 1, and on the outer circumferential surface of the torpedo 22 as one component of the gate opening and closing mechanism 2, concaved grooves 22D that are twisted with respect to the resin injection direction and serve as a plurality of resin flow channels wound in one direction are provided, and therefore, in comparison to the construction in which a resin passes between parts of the gate opening and closing mechanism 2 or passes inside the parts (for example, the inside of the coil spring 23), the resin flow becomes very smooth and has less trouble as result of jamming of the resin or resin solidification. When maintenance of the parts forming the gate opening and closing mechanism 2 is performed, no resin enters the insides of the torpedo 22, the coil spring 23, and the cover 24, so that maintenance becomes very easy.

Second Embodiment

Next, a second embodiment is described with reference to FIG. 5 through FIG. 8.

Figure 5:
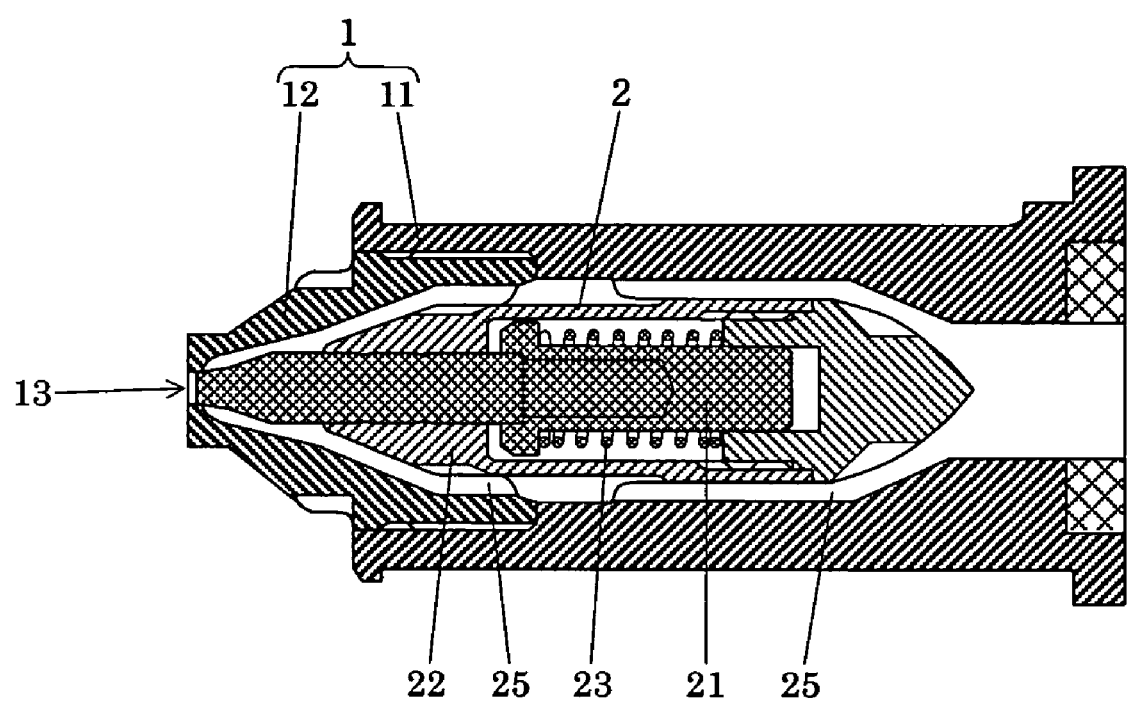
FIG. 5 is a sectional view showing a second embodiment of a valve nozzle according to the invention.
Figure 6:
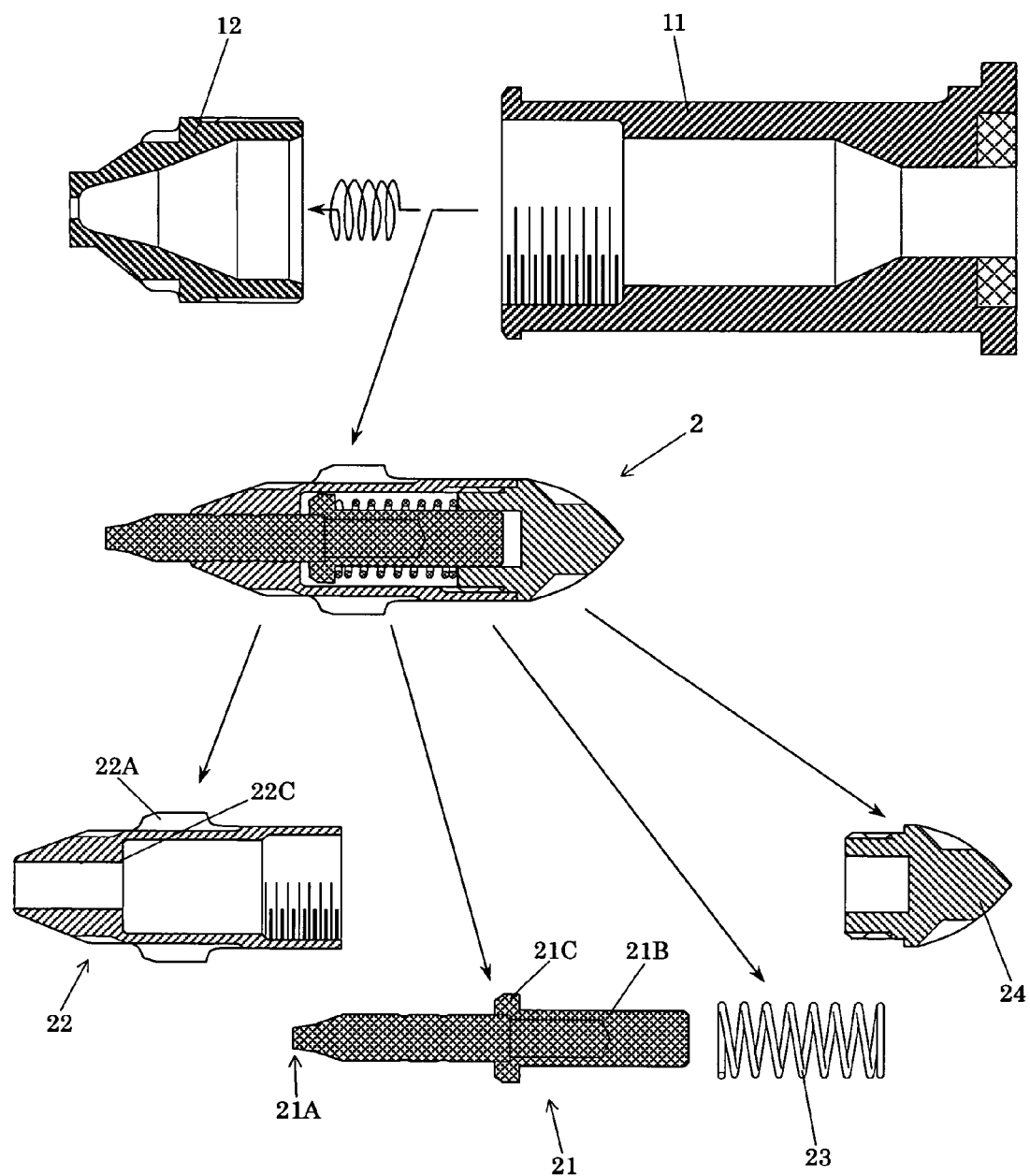
FIG. 6 is an exploded explanatory view of FIG. 5.

In FIG. 5, the valve nozzle of the second embodiment of the invention comprises a valve nozzle main body 1 and a gate opening and closing mechanism 2 disposed in the internal space of the valve nozzle main body 1.

The valve nozzle main body 1 comprises, as shown in FIG. 5, a nozzle holder 11 and a nozzle head 12 to be screwed with the nozzle holder 11, and a gate 13 is formed on the front end of the nozzle head.

The gate opening and closing mechanism 2 comprises, as shown in FIG. 5, a piston 21 having a head part 21A and a shaft part 21B formed continuously from the head part 21A, a torpedo 22 that slidably supports the piston 21 and serves as a guide for the piston 21, and has two or more convex streaks 22A formed on the entire outer circumference so as to be in contact with the inner circumferential surface of the valve nozzle main body 1, a coil spring 23 which is disposed inside the torpedo 22 and inserted with the shaft part 21B of the piston 21, and presses the piston 21 in the direction toward the gate 13 (to the left side of the drawing), and a cover 24 which is attached to the rear end of the torpedo 22 to close the rear end and serves as a spring receiving part of the coil spring 23, and these members are integrally assembled and disposed in the internal space of the valve nozzle main body 1.

Figure 7:
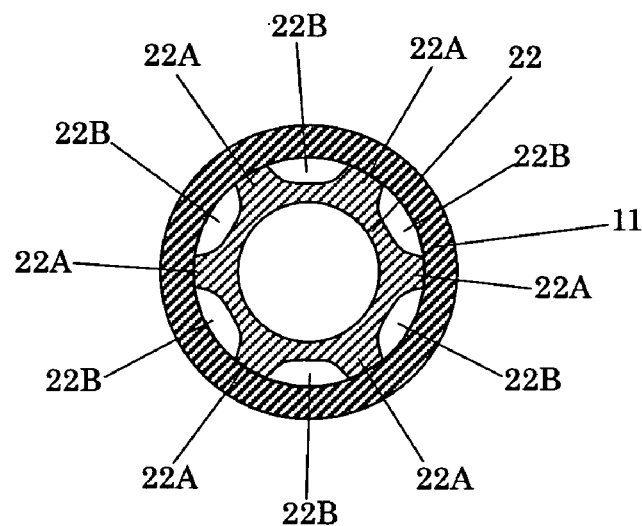
FIG. 7 is a main part sectional view showing resin flow channels (viewed from the resin injection direction).

The gate opening and closing mechanism 2 is disposed in the internal space of the valve nozzle main body 1 so as to leave spaces between the outer circumferential surface of the gate opening and closing mechanism 2 and the inner circumferential surface of the valve nozzle main body 1. Namely, two or more convex streaks 22A formed on the outer circumferential surface of the torpedo 22 as one component of the gate opening and closing mechanism 2 comes into contact with the inner circumferential surface of the valve nozzle main body 1, whereby the gate opening and closing mechanism 2 is supported in a floating state while leaving spaces without contact of the outer circumferential surface except for the convex streaks 22A with the inner circumferential surface of the valve nozzle main body 1, and the spaces serve as resin flow channels 25 when a resin is injected. On the portions formed with the convex streaks 22A of the torpedo 22, as shown in FIG. 7, concaved grooves 22B are created between two or more (six in this FIG. 3) convex streaks 22A, so that a resin flows through the concaved grooves 22B.

In the invention, in order to dispose the gate opening and closing mechanism 2 in the internal space of the valve nozzle main body 1 in a floating manner while leaving spaces that serve as resin flow channels, and in order to create concaved grooves 22B to serve as resin flow channels 25, two or more convex streaks 22A are formed on the outer circumferential surface of the torpedo 22, however, as a matter of course, as a technique in which the concaveds and convexes are inverted, a construction is also included in which concaved grooves 22B are formed on the outer circumferential surface of the torpedo 22 to form the outer circumferential surface except for the concaved grooves 22B into convex grooves 22A.

Figure 8:
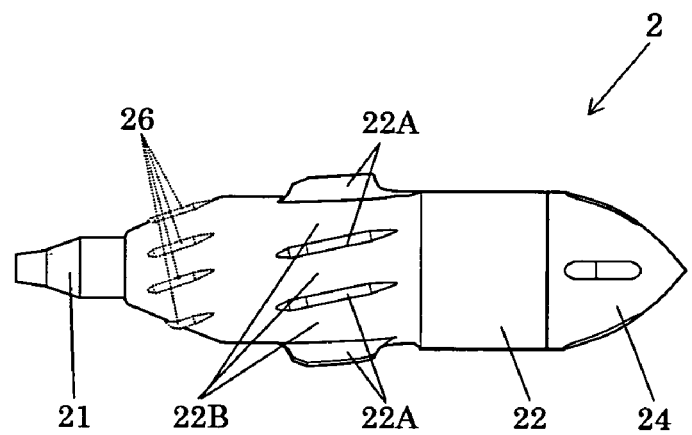
FIG. 8 is a front view of a gate opening and closing mechanism.
eb;normal

Preferably, the convex streaks 22A are formed by being twisted with respect to the resin injection direction as shown in FIG. 8, whereby the resin injected does not flow straight but flows while being twisted by passing through the concaved grooves 22B between two or more convex streaks 22A, so that the resin uniformly radially flows in all directions, the flow around the gate 13 becomes smooth, the resin is injected in all directions 360° immediately before the gate 13, and the resin flow becomes smooth. For this purpose, as shown by the dotted lie in FIG. 4, it is preferable that a blade 26 which twists the resin with respect to the resin injection direction is provided ahead of the convex streaks 22A (gate 13 side) of the torpedo 22.

When the nozzle is closed (in the state shown in FIG. 5), the piston 21 stands still while the flange part 21C formed in the middle of the shaft part 21B is in contact with the stepped portion 22C formed inside the torpedo 22. The head part 21A of the piston 21 has a circular section, and when the nozzle is closed, the outer circumference of the circular section portion in the vicinity of the front end of the head part 21A is in contact with the inner wall of the circular hole of the gate 13 and closes the resin flow channels 25.

When the resin pressure becomes a predetermined value or more, the head part 21A of the piston 21 overcomes the pressing force of the coil spring 23 and withdraws from the gate 13 of the nozzle head 12 to release the gate 13 and open the resin flow channels 25. It is preferable that the withdrawal amount of the piston 21 is properly set according to the pressing force of the coil spring 23 or by positional adjustment of the cover 24 to be attached to the rear end of the torpedo 22. When the resin pressure becomes a predetermined value or less, the piston 21 returns to the state shown in FIG. 5 and closes the resin flow channels 25.

The piston 21 is slidably supported by the torpedo 22 as described above, so that when the piston moves, the torpedo 22 serves as a guide, and the piston can accurately reciprocate straight without positional deviation of the head part 21 from the gate 13.

According to the second embodiment of the invention constructed as described above, in the internal space of the valve nozzle main body 1 that comprises a nozzle holder 11 and a nozzle head 12 attached to the front end of the nozzle holder 11, a gate opening and closing mechanism 2 in which a piston 21, a torpedo 22, a coil spring 23, and a cover 24 are integrally installed is provided, so that for maintenance, the whole of the gate opening and closing mechanism 2 can be removed at one time by removing the nozzle head 12. Therefore, maintenance is remarkably improved in comparison to the priorly proposed technique which requires multi-stage disassembly in which after the nozzle head is removed, the cover is removed and the coil spring is removed, and finally a spool having a feather-shaped projection is removed last.

Particularly, the gate opening and closing mechanism 2 is disposed in the internal space of the valve nozzle main body 1 so as to leave spaces between the outer circumferential surface of the gate opening and closing mechanism 2 and the inner circumferential surface of the valve nozzle main body 1, and furthermore, two or more convex streaks 22A formed on the outer circumferential surface of the torpedo 22 as one component of the gate opening and closing mechanism 2 comes into contact with the inner circumferential surface of the valve nozzle main body 1, whereby the gate opening and closing mechanism 2 is supported in a floating state while leaving spaces without contact between its outer circumferential surface and the inner circumferential surface of the valve nozzle main body 1, and the spaces serve as resin flow channels 25, and this makes the resin flow very smoothly and has much less trouble such as resin jamming or resin solidification in comparison to the construction in which a resin passes between the parts of the gate opening and closing mechanism 2 or passes through the insides of the parts (for example, the inside of the coil spring 23). When maintenance of the parts of the gate opening and closing mechanism 2 is performed, the resin does not enter the insides of the coil spring 23 and the cover 24, so that maintenance becomes very easy.

What is claimed is:

1. A valve nozzle, wherein in an internal space of a valve nozzle main body comprising a nozzle holder and a nozzle head attached to the front end of the nozzle holder, a gate opening and closing mechanism is disposed which comprises, in an integrally assembled manner;

a piston having a head part and a shaft part formed continuously from the head part;

a torpedo which is disposed in the internal space of the nozzle head and supported thereby, and which slidably supports and guides the piston, resin flow channels being provided between the outer surface of the torpedo and the inner surface of the nozzle holder;

a coil spring which is disposed inside the torpedo and inserted with the shaft part of the piston, and presses the piston in the direction toward the gate;

a cover which is attached to the rear end of the torpedo to close the rear end and serves as a spring receiving part of the coil spring; and when the resin pressure is at a predetermined value or less, the piston is pressed in the direction toward the gate by the coil spring and the entire circumference of the circular section of the head part of the piston comes into contact with the gate inner wall of the nozzle head to close the resin flow channels, and when the resin pressure becomes a predetermined value or more, the head part of the piston overcomes the pressing forces of the coil spring and withdraws from the gate of the nozzle head to release the gate; characterised in that the torpedo has an outer circumferential surface which contacts the inner circumferential surface of the nozzle holder to support the gate opening and closing mechanism, except where said outer circumferential surface is interrupted by grooves which provide said resin flow channels, said grooves being twisted with respect to the resin injection direction.

2. The valve nozzle according to claim 1, wherein the grooves that serve as a plurality of resin flow channels provided on the outer circumferential surface of the torpedo are wound in one direction.

3. The valve nozzle according to claim 2, wherein the grooves that are provided on the outer circumferential surface of the torpedo and serve as resin flow channels are formed axisymmetrically and serve as two resin flow channels continuously wound.

4. The valve nozzle according to claim 1, wherein the grooves that are provided on the outer circumferential surface of the torpedo and serve as resin flow channels are provided in parallel and serve as a plurality of resin flow channels intermittently wound.

5. A valve nozzle, comprising:
- a valve main body having a nozzle holder head attached to one end of said nozzle holder, said nozzle head having an internal space, said nozzle holder having an inner circumferential surfaces;
- a gate in said nozzle head; and
- a gate opening and closing mechanism in said main body and removable as a single unit from said main body, said gate opening and closing mechanism including
- a piston having a head part and a shaft part extending continuously from said head part,
- a torpedo in said internal space having an outer circumferential surface contacting said inner circumferential surface to support said torpedo in said nozzle holder, said torpedo receiving and guiding said piston,
- resin flow channels formed by grooves in said outer circumferential surface of said torpedo, said grooves extending along spiral paths about a resin injection direction, all of said outer circumferential surface between said grooves engaging said inner circumferential surface,
- a coil spring inside said torpedo and engaging said shaft part to bias said piston toward said gate, and
- a cover attached to an open rear end of said torpedo to close said rear end and to receive an end of said coil spring remote from said shaft part.

6. A valve nozzle according to claim 5, wherein said spiral paths are wound in a single direction.

7. A valve nozzle according to claim 5, wherein said grooves are formed axisymmetrically, and form two continuously wound resin channels.

8. A valve nozzle according to claim 5 wherein said grooves are in parallel, and are intermittently wound.

* * * * *